(12) United States Patent
Hsieh et al.

(10) Patent No.: US 10,023,764 B2
(45) Date of Patent: Jul. 17, 2018

(54) ZINC (1-METHYLIMIDAZOLE)BIS(2-ETHYLHEXANOATE) COMPLEX CATALYZED COATING MATERIAL COMPOSITION

(71) Applicant: BASF Coatings GmbH, Münster (DE)

(72) Inventors: Bing Hsieh, Ridgefield, CT (US); Robert D. Coughlin, Norwalk, CT (US); Ramanathan Ravichandran, Suffern, NY (US); Farouk Abi-Karam, Wilton, CT (US); Elke Westhoff, Steinfurt (DE); Peter Hoffmann, Senden (DE); Bernadette Möller, Maria-Veen (DE); Benedikt Schnier, Warendorf (DE)

(73) Assignee: BASF Coatings GmbH, Münster (DE)

( * ) Notice: Subject to any disclaimer, the term of this patent is extended or adjusted under 35 U.S.C. 154(b) by 0 days.

(21) Appl. No.: 14/372,614

(22) PCT Filed: Jan. 24, 2013

(86) PCT No.: PCT/EP2013/051350
§ 371 (c)(1),
(2) Date: Jul. 16, 2014

(87) PCT Pub. No.: WO2013/110712
PCT Pub. Date: Aug. 1, 2013

(65) Prior Publication Data
US 2015/0018197 A1   Jan. 15, 2015

Related U.S. Application Data

(60) Provisional application No. 61/590,350, filed on Jan. 25, 2012.

(30) Foreign Application Priority Data

Jan. 25, 2012 (EP) .................................... 12152406

(51) Int. Cl.
| C08L 75/04 | (2006.01) |
| --- | --- |
| C08K 5/09 | (2006.01) |
| C08G 18/22 | (2006.01) |
| C09D 175/06 | (2006.01) |
| C08G 18/62 | (2006.01) |
| C08G 18/79 | (2006.01) |
| C08G 18/16 | (2006.01) |
| C09D 175/14 | (2006.01) |
| B05D 1/00 | (2006.01) |
| B05D 1/02 | (2006.01) |
| B05D 1/04 | (2006.01) |
| B05D 3/02 | (2006.01) |

(52) U.S. Cl.
CPC ........... *C09D 175/06* (2013.01); *B05D 1/005* (2013.01); *B05D 1/02* (2013.01); *B05D 1/04* (2013.01); *B05D 3/0209* (2013.01); *B05D 3/0272* (2013.01); *C08G 18/161* (2013.01); *C08G 18/166* (2013.01); *C08G 18/222* (2013.01); *C08G 18/6225* (2013.01); *C08G 18/792* (2013.01); *C09D 175/14* (2013.01)

(58) Field of Classification Search
CPC .......... C08K 5/09; C08L 75/04; C08G 18/222
See application file for complete search history.

(56) References Cited

U.S. PATENT DOCUMENTS

| 4,006,124 | A | 2/1977 | Welte et al. |
| --- | --- | --- | --- |
| 4,426,510 | A * | 1/1984 | DelDonno ........... C08G 18/089 521/113 |
| 4,939,213 | A | 7/1990 | Jacobs, III et al. |
| 5,084,541 | A | 1/1992 | Jacobs, III et al. |
| 6,084,026 | A * | 7/2000 | Jamasbi ........................ 524/590 |
| 6,403,699 | B1 | 6/2002 | Rockrath et al. |
| 2003/0027921 | A1 | 2/2003 | Speier et al. |
| 2005/0182189 | A1 | 8/2005 | Ohrbom et al. |
| 2006/0036007 | A1 | 2/2006 | Hsieh et al. |
| 2006/0247341 | A1 | 11/2006 | Hsieh et al. |
| 2008/0234410 | A1* | 9/2008 | Van Engelen ..... C08G 18/4063 523/507 |
| 2009/0011124 | A1 | 1/2009 | Hsieh et al. |
| 2010/0279005 | A1 | 11/2010 | Vaes et al. |

FOREIGN PATENT DOCUMENTS

| EP | 0008127 | 2/1980 |
| --- | --- | --- |
| EP | 0249201 | 12/1987 |
| EP | 0624577 | 11/1994 |
| EP | 0276501 | 8/1998 |
| EP | 0882748 | 12/1998 |

(Continued)

OTHER PUBLICATIONS

PCT International Preliminary Report on Patentability in PCT/EP2013/051350, dated Aug. 7, 2014, 7 pages.
PCT International Search Report and Written Opinion in PCT/EP2013/051350, dated Apr. 5, 2013, 10 pages.
Non-Final Office Action in U.S. Appl. No. 14/006,024, dated May 19, 2015, 7 pages.
Trixene BI 7984—Technical Information, *Baxenden*, dated Mar. 10, 1996, 1 page.

*Primary Examiner* — Brieann R Johnston

(74) *Attorney, Agent, or Firm* — Servilla Whitney LLC

(57) ABSTRACT

Described are coating material compositions comprising an isocyanate group-containing component, a hydroxyl group-containing component, and a zinc (1-methylimidazole)bis (2-ethylhexanoate) complex. Also described is the use of a zinc (1-methylimidazole)bis(2-ethylhexanoate) complex as a catalyst system for the urethane reaction in coating material compositions.

26 Claims, No Drawings

(56) References Cited

FOREIGN PATENT DOCUMENTS

| EP | 0994117 | 4/2000 |
|----|---------|--------|
| EP | 1273640 | 1/2003 |
| EP | 1460094 | 9/2004 |
| WO | WO-94/22968 | 10/1994 |
| WO | WO-0109260 | 2/2001 |
| WO | WO-2004/029121 | 4/2004 |
| WO | WO-2009/135600 | 11/2009 |

* cited by examiner

ZINC (1-METHYLIMIDAZOLE)BIS (2-ETHYLHEXANOATE) COMPLEX CATALYZED COATING MATERIAL COMPOSITION

CROSS-REFERENCE TO RELATED APPLICATIONS

This application is the National State entry of PCT/EP2013/051350, filed on Jan. 24, 2013, which claims priority to U.S. Provisional Application Ser. No. 61/590,350, filed on Jan. 25, 2012 and to European Patent Application No. 12152406.0, filed on Jan. 25, 2012, the disclosures of which are incorporated herein by reference in their entireties.

TECHNICAL FIELD

The invention relates to coating material compositions comprising an isocyanate group-containing component, a hydroxyl group-containing component, and a zinc (1-methyl-imidazole)bis(2-ethylhexanoate) complex, and also to the use of a zinc (1-methylimidazole)bis(2-ethylhexanoate) complex as a catalyst system for the urethane reaction in coating material compositions.

BACKGROUND

Two component polyurethane systems find broad application as paints, foams, fibers, and nonporous moldings. Where the crosslinking partners are reactive even at room temperature, the polymer is obtained by mixing and subsequently reacting an isocyanate group-containing component with a hydroxyl group-containing component. The reaction here of the isocyanate group with the hydroxyl group is frequently catalyzed with addition of basic compounds, such as tertiary amines or compounds containing amidine groups. Examples of such compounds are 1,4-diazabicyclo[2.2.2]octane or 1,8-diazabicyclo[5.4.0]undec-7-ene (DBU). A markedly higher catalytic activity, however, is possessed by organometallic compounds, such as dibutyltin dilaurate or various zinc carboxylates. The amount of catalyst used is determined on the one hand so as to ensure a sufficiently long processing life for the area of application, and on the other hand so as to attain, as early as possible following application, a profile of properties that is sufficient for subsequent operations. For automotive refinish in particular it is important to attain a rapid assembly strength.

The tin-based catalysts well-known from the prior art, such as dibutyltin dilaurate, dioctyltin dilaurate, dibutyltin diacetate, dibutyltin maleate or tetrabutylstannoxane diacetate, are effective catalysts for the formation of the urethane bond, but these compounds are toxic. On account of the toxicity of many tin compounds, attempts have been made for a long time already to find substitute catalysts suitable for coating material compositions.

Accordingly, the article "Catalysis of the Isocyanate-Hydroxyl Reaction by Non-Tin Catalysts" by Werner J. Blank, Z. A. He, and Ed. T. Hessell from King Industries Inc., describes alternatives to the conventional tin-containing catalysts, on the basis of various metal salts and metal complexes, such as zirconium chelates, aluminum chelate, and bismuth carboxylate.

WO 2009/135600 describes catalysts based on N-heterocyclic carbenes for the synthesis of polyurethanes. EP 1 460 094 describes catalysts based on metal salts in conjunction with bicyclic tertiary amine compounds and a quaternary ammonium salt. U.S. Pat. No. 4,006,124 describes general amidine-metal complexes as catalysts for the isocyanate polyaddition reaction. WO 2004/029121 discloses the use of acids having a $pK_a$ of between 2.8 and 4.5 as catalysts for the urethane reaction. A failing common to all these catalysts is that they result either in excessively slow curing of the coating system or else in a curtailed working time (pot life). Moreover, a number of the catalysts identified above cause discoloration of the coating materials or a subsequent yellowing of the applied coatings. Compounds of this kind are unsuitable for high-grade clearcoat systems. In addition, the publications identified above also describe cadmium and lead-containing catalysts, which on account of their toxicity are also out of contention as alternatives to tin-based catalysts. The bismuth- or zirconium-based catalysts described in the publications identified above are sensitive to hydrolysis and ought therefore only to be diluted in the curing agent. On account of the sensitivity to hydrolysis, coating systems based on bismuth and zirconium catalysts, moreover, possess a short shelf life.

As already described above, amines may also have a catalyzing activity on the polyurethane reaction. Nevertheless, their pot life is insufficient for processing in the automotive refinish segment. On account of the high vapor pressure of amines of low molecular mass, the only amines, if any, that are contemplated for this application are those such as diazabicycloundecene (DBU) or diazabicyclononene (DBN). Use of these amines, though, leads to strongly colored mixtures, and the resultant catalyzed coating systems have a propensity to unacceptable yellowing.

US 2006/0036007 discloses organometallic complexes as catalysts for the crosslinking of polyurethane-based systems. Described therein in particular are amidine compounds of zinc for the catalysis of the reaction of hydroxyl group-containing components with isocyanate group-containing components. These catalysts are said to be adsorbed on fumed silica. In 2006/0247341 and US 2009/0011124, amidine-zinc complexes are likewise used as catalysts in 2-component polyurethane coating systems. These catalysts are said to be particularly stable to hydrolysis and to be suitable also for use in aqueous systems. Nevertheless, the catalyst systems disclosed in these three documents do not exhibit sufficient curing properties. A comparison of the reactivity of these systems with tin-catalyzed systems shows that these zinc-amidine-based catalysts have poorer curing properties for a given processing life.

SUMMARY

A first aspect of the invention is directed to a coating material composition. In a first embodiment, a coating material composition comprises at least one polyhydroxyl group-containing component (A); at least one polyisocyanate group-containing component (B); at least one zinc (1-methylimidazole)bis(2-ethylhexanoate) complex (D) having the general formula $[Zn(1\text{-methylimidazole})_n(2\text{-ethylhexanoate})_2]$, wherein $n \geq 1$ to $\leq 2$; and at least one monomeric aromatic carboxylic acid (S), wherein the carboxyl group is in conjugation to a pi electron system.

In a second embodiment, the coating material composition of the first embodiment is modified, wherein the at least one polyhydroxyl group-containing component (A) comprises a poly(meth)acrylate polyol and/or a polyester resin.

In a third embodiment, the coating material composition of the first and second embodiment is modified, wherein the polyisocyanate group-containing component (B) comprises 1,6-hexamethylene diisocyanate, isophorone diisocyanate, or 4,4'-methylenedicyclohexyl diisocyanate, their biuret dimers and/or their isocyanurate trimers and/or their asymmetric trimers.

In a fourth embodiment, the coating material composition of the first through third embodiments is modified, wherein the at least one monomeric aromatic carboxylic acid (S) comprises benzoic acid, tert-butylbenzoic acid, 3,4-dihydroxybenzoic acid, salicylic acid and/or acetylsalicylic acid.

In a fifth embodiment, the coating material composition of the first through fourth embodiments is modified, wherein the at least one zinc (1-methylimidazole)bis(2-ethylhexanoate) complex (D) is present in an amount such that the metal content of the zinc (1-methylimidazole)bis(2-ethylhexanoate) complex, based in each case on the binder fraction of the coating material, is between 35 and 2000 ppm, and/or the coating material comprises 0.2% to 15.0%, by weight, of at least one monomeric carboxylic acid (S), the percentages by weight again each being based on the binder fraction of the coating material.

In a sixth embodiment, the coating material composition of the first through fifth embodiments is modified, wherein the coating material composition further comprises one or more hydroxyl-containing compounds (C) different from component (A), and/or wherein the molar equivalent ratio of the hydroxyl groups of the hydroxyl-containing compound (A) plus where appropriate (C) to the isocyanate groups of component (B) is between 1:0.9 and 1:1.5.

In a seventh embodiment, the coating material composition of the first through sixth embodiments is modified, wherein the coating material composition is a nonaqueous coating material and/or comprises pigments.

A second aspect of the present invention is directed to a catalyst system. In an eighth embodiment, a catalyst system comprises at least one zinc (1-methylimidazole)bis(2-ethylhexanoate) complex (D) and at least one monomeric aromatic carboxylic acid (S) in which the carboxyl group is in conjugation to a pi electron system, wherein the catalyst system catalyzes a urethane reaction in a coating material composition comprising at least one polyisocyanate group-containing component and at least one polyhydroxyl group-containing component.

In a ninth embodiment, the catalyst system of the eighth embodiment is modified, wherein the coating material composition further comprises at least one polyhydroxyl group-containing component (A) and at least one polyisocyanate group-containing component (B) and/or the catalysis is carried out at a temperature in the range of from 20 to 60° C.

A third aspect of the present invention is directed to a method. In a tenth embodiment, a method of coating comprises producing a coat of the coating material composition of the first through seventh embodiments on an automobile.

A fourth aspect of the present invention is directed to a method. In an eleventh embodiment, a multistage coating method, comprises applying, to an uncoated or precoated substrate, a pigmented basecoat film and thereafter a coat of the coating material composition of the first through seventh embodiments.

In a twelfth embodiment, the multistage coating method the eleventh embodiment is modified, wherein, following application of the pigmented basecoat film, the applied basecoat is first dried at temperatures from 23° C. room temperature to 80° C. and, following the application of the coating material, is cured at temperatures between 20 and 80° C.

A fifth aspect of the present invention is directed to a method. In a thirteenth embodiment, a method of coating comprises coating a substrate with a clearcoat or pigmented paint comprising the coating material composition of the first through seventh embodiments, wherein the substrate comprises one or more of an automotive surface, a parts surface, a plastics substrate, or a utility vehicle surface.

In a fourteenth embodiment, the method of the eleventh and twelfth embodiments is modified, wherein the substrate comprises one or more of an automotive surface, a plastic substrate, or an utility vehicle surface.

A further aspect of the present invention is directed to an automobile coating. In a fifteenth embodiment, an automobile coating comprises at least one coat of the coating material composition of the first through seventh embodiments.

A still further aspect of the present invention is directed to a method. In a sixteenth embodiment, a multistage coating method, comprises applying, to an uncoated or precoated substrate, a pigmented basecoat film and thereafter applying a coating material composition produced through use of the catalyst system of the eighth or ninth embodiments.

In a seventeenth embodiment, the multistage coating method of the sixteenth embodiment is modified, wherein, following application of the pigmented basecoat film, the applied basecoat is first dried at temperatures from 23° C. room temperature to 80° C. and, following the application of the coating material composition, is cured at temperatures between 20 and 80° C.

In an eighteenth embodiment, the coating material composition of the first and second embodiments is modified, wherein the polyhydroxyl group-containing component (A) comprises a poly(meth)acrylate polyol.

In a nineteenth embodiment, the coating material composition of the first through fourth embodiments is modified, wherein the at least one monomeric aromatic carboxylic acid (S) comprises benzoic acid.

In a twentieth embodiment, the coating material composition of the first through sixth embodiments is modified, wherein the molar equivalent ratio of the hydroxyl groups of the hydroxyl-containing compound (A) plus, where appropriate, (C) to the isocyanate groups of component (B) is between 1:0.95 and 1:1.05.

DETAILED DESCRIPTION

Provided are coating systems with suitable catalysts which exhibit not only rapid curing of the system but also a long processing life. Moreover, the coating systems confer on the user the possibility of rapid further-processing of the surfaces/articles coated with the systems. These systems, furthermore, do not to exhibit any changes in color before or after curing. In the area of clearcoats in the automobile industry, in particular, the requirements imposed on the inherent color of the systems are exacting. Thus the catalyst does not have an inherent color, and nor does it, together with the customary coating components, lead to any discoloration when the coating material is mixed or cured. The catalyst, moreover, is able to be added to the coating system from the outset. Admixing the catalyst to the coating systems from the start, however, does not to have any adverse effect on the shelf life of the coating composition. Additionally, the catalyst is insensitive to hydrolysis, since, even in systems in organic solution, the typically high concentration of hydroxyl groups can lead to a reduction in catalyst activity over the storage life. In the automotive refinish segment especially, an extremely long shelf life even at relatively high temperatures is an advantage.

In one or more embodiments, a coating material composition comprises
- at least one polyhydroxyl group-containing component (A),
- at least one polyisocyanate group-containing component (B),
- at least one zinc (1-methylimidazole)bis(2-ethylhexanoate) complex (D) having the general formula [Zn(1-methylimidazole)$_n$(2-ethylhexanoate)$_2$], wherein n≥1 to ≤2, preferably n=1 or 2, and
- at least one monomeric aromatic carboxylic acid (S), in which the carboxyl group is in conjugation to a pi electron system.

As a result of the use of a catalyst system comprising at least one zinc (1-methylimidazole)bis(2-ethylhexanoate) complex (D) and at least one monomeric aromatic carboxylic acid (S) in which the carboxyl group is in conjugation to a pi electron system, in coating materials featuring at least one polyisocyanate group-containing component and at least one polyhydroxyl group-containing component, the corresponding coating systems display excellent curing properties, early capacity for operations, and an extended processing life, and, furthermore, these catalyst systems are insensitive to hydrolysis and do not cause any discoloration or yellowing of the coating system.

In one or more embodiments, the present invention relates to coating material compositions comprising
- at least one polyhydroxyl group-containing component (A),
- at least one polyisocyanate group-containing component (B),
- at least one zinc (1-methylimidazole)bis(2-ethylhexanoate) complex (D) having the general formula [Zn(1-methylimidazole)$_n$(2-ethylhexanoate)$_2$], where n≥1 to ≤2, preferably n=1 or 2, and
- at least one monomeric aromatic carboxylic acid (S), in which the carboxyl group is in conjugation to a pi electron system.

As the at least one polyhydroxyl group-containing component (A) it is possible to use all compounds known to the skilled person that have at least two hydroxyl groups per molecule and are oligomeric and/or polymeric.

In one or more embodiments, the oligomeric and/or polymeric polyols (A) have mass-average molecular weights Mw>500 daltons, measured by means of gel permeation chromatography (GPC) against a polystyrene standard, preferably between 800 and 100 000 daltons, more particularly between 1000 and 50 000 daltons.

In specific embodiments, the oligomeric and/or polymeric polyols (A) are polyester polyols, polyurethane polyols, polysiloxane polyols, polyacrylate polyols and/or polymethacrylate polyols, and also their copolymers.

In one or more embodiments, the polyols have an OH number of 30 to 400 mg KOH/g, more particularly between 100 and 300 mg KOH/g. The hydroxyl number (OH number) indicates the number of mg of potassium hydroxide that are equivalent to the amount of acetic acid bound by 1 g of substance on acetylation.

The glass transition temperatures, measured by means of DSC measurements in accordance with DIN-EN-ISO 11357-2, of the polyols are, in one or more embodiments, between −150 and 100° C., more preferably between −120° C. and 80° C.

Suitable polyester polyols are described in, for example, EP-A-0 994 117 and EP-A-1 273 640. In one or more embodiments, polyurethane polyols are prepared by reaction of polyester polyol prepolymers with suitable di- or polyisocyanates, and are described in EP-A-1 273 640, for example. Suitable polysiloxane polyols are described in, for example, WO-A-01/09260, and the polysiloxane polyols cited therein may be employed in combination with further polyols, more particularly those having relatively high glass transition temperatures.

In one or more specific embodiments, the poly(meth)acrylate polyols are generally copolymers and have mass-average molecular weights Mw of between 1000 and 20 000 daltons, more specifically between 1500 and 10 000 daltons, in each case measured by means of gel permeation chromatography (GPC) against a polystyrene standard.

The glass transition temperature of the copolymers is generally between −100 and 100° C., more particularly between −50 and 80° C. (measured by means of DSC measurements in accordance with DIN-EN-ISO 11357-2).

In one or more embodiments, the poly(meth)acrylate polyols have an OH number of 60 to 250 mg KOH/g, more particularly between 70 and 200 KOH/g, and also an acid number of between 0 and 30 mg KOH/g.

In one or more embodiments, the hydroxyl-containing monomer building blocks used are hydroxyalkyl acrylates and/or hydroxyalkyl methacrylates, such as, more particularly, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, and 3-hydroxybutyl methacrylate, and also, in particular, 4-hydroxybutyl acrylate and/or 4-hydroxybutyl methacrylate.

In one or more embodiments, alkyl acrylates and/or alkyl methacrylates, such as, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and/or cycloalkyl methacrylates, such as cyclopentyl acrylate, cyclopentyl methacrylate, isobornyl acrylate, isobornyl methacrylate or, in particular, cyclohexyl acrylate and/or cyclohexyl methacrylate are used as further monomer building blocks for the poly(meth)acrylate polyols.

As further monomer building blocks for the poly(meth)acrylate polyols it is possible to use vinylaromatic hydrocarbons, such as vinyltoluene, alpha-methylstyrene or, in particular, styrene, amides or nitriles of acrylic or methacrylic acid, vinyl esters or vinyl ethers, and also, in minor amounts, in particular, acrylic and/or methacrylic acid.

In one or more embodiments, poly(meth)acrylate polyols and/or polyester resins, more preferably poly(meth)acrylate polyols, as polyhydroxyl group-containing component (A) are used.

Suitability as the at least one polyisocyanate group-containing component (B) is possessed by conventional substituted or unsubstituted aromatic, aliphatic, cycloaliphatic and/or heterocyclic polyisocyanates. In one or more embodiments, examples of polyisocyanates are as follows: 2,4-toluene diisocyanate, 2,6-toluene diisocyanate, diphenylmethane 4,4'-diisocyanate, diphenylmethane 2,4'-diisocyanate, p-phenylene diisocyanate, biphenyl diisocyanates, 3,3'-dimethyl-4,4'-diphenylene diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, 1,12-dodecane diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylenedicyclohexyl diisocyanate (e.g., Desmodur® W from Bayer AG), tetramethylxylyl diisocyanates (e.g., TMXDI® from American Cyanamid) and mixtures of the aforementioned polyisocyanates. Preferred polyisocyanates are also the biuret dimers and the isocyanurate trimers of the aforementioned diisocyanates. Particularly preferred polyisocyanates (B) are hexamethylene 1,6-diisocyanate, isophorone diisocyanate, and 4,4'-methylenedicyclohexyl diisocyanate, their biuret dimers and/or their isocyanurate trimers and/or their asymmetric trimers such as, for example, the asymmetric HDI-trimer available commercially under the name Desmodur®XP2410.

Furthermore, however, it is also possible to use the conventional derivatives of the aforementioned organic aliphatic, cycloaliphatic, aromatic or heterocyclic polyisocyanates with carbodiimide, uretonimine, uretdione, allophanate, biuret and/or isocyanurate structure, and also prepolymers obtained by reacting the polyisocyanate with compounds having hydrogens that are reactive toward isocyanate groups.

The polyisocyanate group-containing component (B) may be present in a suitable solvent. Suitable solvents are those which allow sufficient solubility of the polyisocyanate component and are free from groups reactive toward isocyanates. Examples of such solvents are acetone, methyl ethyl ketone, cyclohexanone, methyl isobutyl ketone, methyl isoamyl ketone, diisobutyl ketone, ethyl acetate, n-butylacetate, ethylene glycol diacetate, butyrolactone, diethyl carbonate, propylene carbonate, ethylene carbonate, N,N-dimethylformamide, N,N-dimethylacetamide, N-methylpyrrolidone, N-ethylpyrrolidone, methylal, butylal, 1,3-dioxolane, glycerol formal, benzene, toluene, n-hexane, cyclohexane, solvent naphtha, 2-methoxypropyl acetate (MPA), and ethyl ethoxypropionate.

Where appropriate, and further to the polyhydroxyl group-containing component (A), the coating materials of the invention may further comprise one or more hydroxyl group-containing compounds (C) that are different from component (A). In one or more embodiments, these compounds (C) account for a fraction of 1% to 20%, more specifically of 1% to 10%, very specifically of 1% to 5%, by weight, based in each case on the binder content of the coating material.

Low molecular mass polyols are used as hydroxyl group-containing compound (C).

Low molecular mass polyols used are, for example, diols, such as, ethylene glycol, neopentyl glycol, 1,2-propanediol, 2,2-dimethyl-1,3-propanediol, 1,4-butanediol, 1,3-butanediol, 1,5-pentanediol, 2,2,4-trimethyl-1,3-pentanediol, 1,6-hexanediol, 1,4-cyclohexanedimethanol, and 1,2-cyclohexanedimethanol, and also polyols, such as, preferably, trimethylolethane, trimethylolpropane, trimethylolhexane, 1,2,4-butanetriol, pentaerythritol, and dipentaerythritol.

The polyhydroxyl group-containing component (A) may be present in a suitable solvent. Suitable solvents are those which allow sufficient solubility of the polyhydroxyl component. Examples of such solvents are acetone, methyl ethyl ketone, cyclohexanone, methyl isobutyl ketone, methyl isoamyl ketone, diisobutyl ketone, ethyl acetate, n-butyl acetate, ethylene glycol diacetate, butyrolactone, diethyl carbonate, propylene carbonate, ethylene carbonate, N,N-dimethylformamide, N,N-dimethylacetamide, N-methylpyrrolidone, N-ethylpyrrolidone, methylal, ethylal, butylal, 1,3-dioxolane, glycerol formal, benzene, toluene, n-hexane, cyclohexane, solvent naphtha, 2-methoxypropyl acetate (MPA), and ethyl ethoxypropionate, and mixtures thereof. Furthermore, the solvents may also carry groups reactive toward isocyanates. Examples of such reactive solvents are those which have an average functionality in terms of groups reactive toward isocyanates of at least 1.8. In this specification, the solvents that are suitable as reactive diluents differ from the polyhydroxyl group-containing component (A) and (C). The solvents that are suitable as reactive diluents are monomers and may be, for example, low molecular mass diamines (e.g., ethylenediamine).

The at least one zinc (1-methylimidazole)bis(2-ethylhexanoate) complex (D) is a complex of zinc(II) with the ligands 1-methylimidazole and 2-ethylhexanoate, having the general formula $[Zn(1\text{-methylimidazole})_n(2\text{-ethylhexanoate})_2]$, where n≥1 to ≤2, specifically n=1 or 2.

It is further essential to the invention that the coating composition comprises at least one monomeric aromatic, unsubstituted or substituted carboxylic acid (S) whose carboxyl group is in conjugation to a pi electron system. The number of carboxyl groups may vary, with the carboxylic acids, in one or more embodiments, having one carboxyl group. In one or more embodiments, the monomeric aromatic, unsubstituted or substituted carboxylic acids (S) have a molecular weight <500 g/mol, more specifically <300 g/mol. In specific embodiments, monomeric aromatic, unsubstituted or substituted carboxylic acids (S) which have a $pK_a$ of 2 to 5 are used. The $pK_a$ corresponds to the pH at the half-equivalent point, the solution medium being water. If it is not possible to cite a $pK_a$ in water for an acid, then the medium selected is DMSO or else another suitable medium in which the acid is soluble.

Suitable acids are monomeric aromatic monocarboxylic and polycarboxylic acids, the corresponding alkyl- and aryl-substituted aromatic monocarboxylic and polycarboxylic acids, and also the corresponding hydroxyl-containing aromatic monocarboxylic and polycarboxylic acids, such as, for example, phthalic acid and terephthalic acid, alkyl- and/or aryl-substituted phthalic acid and terephthalic acid, benzoic acid and alkyl- and/or aryl-substituted benzoic acid, aromatic carboxylic acids with further functional groups such as salicylic acid and acetylsalicyclic acid, alkyl- and aryl-substituted salicylic acid or isomers thereof, polycyclic aromatic carboxylic acids, such as the isomers of naphthalenecarboxylic acid, and derivatives thereof.

In one or more embodiments, the coating material comprises, as monomeric aromatic carboxylic acid (S), benzoic acid, tert-butylbenzoic acid, 3,4-dihydroxybenzoic acid, salicylic acid and/or acetylsalicylic acid, more specifically benzoic acid.

Where the coating materials are one-component materials, the polyisocyanate group-containing compounds (B) selected are those whose free isocyanate groups are blocked with blocking agents. The isocyanate groups may be blocked, for example, with substituted pyrazoles, in particular with alkyl-substituted pyrazoles, such as 3-methylpyrazole, 3,5-dimethylpyrazole, 4-nitro-3,5-dimethylpyrazole, 4-bromo-3,5-dimethylpyrazole, and so on. With particular preference the isocyanate groups of component (B) are blocked with 3,5-dimethylpyrazole.

In one or more embodiments, the two-component (2-K) coating materials entail the mixing, shortly before the application of the coating material, of a coating component comprising the polyhydroxyl group-containing compound (A) and also further components, described below, with a further coating component comprising the polyisocyanate group-containing compound (B) and also, if desired, further of the components described below, this mixing taking place in a conventional way; in general, the coating component which comprises the compound (A) comprises the zinc (1-methylimidazole)bis(2-ethylhexanoate) complex (D) and also a portion of any solvent present.

In one or more embodiments, the weight fractions of the polyhydroxyl group-containing component (A) and, where appropriate, (C) and of the polyisocyanate group-containing component (B) are selected such that the molar equivalents ratio of the hydroxyl groups of the polyhydroxyl group-containing compound (A) plus, where appropriate (C) to the isocyanate groups of component (B) is between 1:0.9 and 1:1.5, specifically between 1:0.9 and 1:1.1, more specifically between 1:0.95 and 1:1.05.

In one or more embodiments, coating materials which comprise from 30% to 80%, specifically from 50% to 70%, by weight, based in each case on the binder content of the coating material, of at least one polyhydroxyl group-containing component (A), specifically at least one polyhydroxyl group-containing polyacrylate (A) and/or at least one polyhydroxyl group-containing polymethacrylate (A) are used.

In one or more embodiments, coating materials which comprise from 5% to 50%, specifically from 25% to 40%, by weight, based in each case on the binder content of the coating material, of the polyisocyanate group-containing component (B) are likewise used.

In one or more embodiments, the coating materials of the invention further comprise at least one zinc (1-methylimidazole)bis(2-ethylhexanoate) complex (D) in an amount such that the metal content of the zinc (1-methylimidazole)bis(2-ethylhexanoate) complex, based in each case on the binder content of the coating material, is between 35 and 2000 ppm, specifically between 35 and 1000 ppm, and more specifically between 100 and 1000 ppm.

The coating materials of the invention, in one or more embodiments, further comprise 0.2% to 15.0%, specifically 0.5% to 8.0%, and more specifically 0.5% to 5.0%, by weight, of at least one monomeric aromatic carboxylic acid (S), the percentages by weight being based in each case on the binder content of the coating material.

In one or more embodiments, the coating material composition is a 2-component system wherein the at least one polyisocyanate group-containing component (B) is stored separately from the at least one polyhydroxyl group-containing component (A) and the components are mixed with one another not until shortly before processing.

In the case of a 2-component system, the zinc (1-methylimidazole)bis(2-ethylhexanoate) complex (D) and the monomeric aromatic carboxylic acid (S) may be included in both components, but particularly only one component comprises one of the stated substances, and particularly both monomeric aromatic carboxylic acid (S) and the zinc (1-methylimidazole)bis(2-ethylhexanoate) complex (D) are in solution in the polyol component.

Furthermore, the 1-methylimidazole may also be in solution in the polyol component, and the zinc bis(2-ethylhexanoate) component in the polyisocyanate component. In that case, the active zinc (1-methylimidazole)bis(2-ethylhexanoate) complex (D) is formed in situ only after the mixing of the polyisocyanate component and the polyol component.

In one or more embodiments, the coating materials are nonaqueous coating materials. The coating materials may comprise solvents or be formulated as solvent-free systems.

Examples of suitable solvents are the solvents already recited for the polyhydroxyl group-containing component (A) and, where appropriate, (C) and for the polyisocyanate group-containing compound (B). The solvent or solvents are used in the coating materials of the invention in an amount such that the solids content of the coating material is at least 50%, more specifically at least 60%, by weight.

The coating materials of the invention may additionally comprise 0% to 30%, specifically 0% to 15%, by weight, based in each case on the binder content of the coating material, of one or more amino resins and/or one or more tris(alkoxycarbonylamino)triazines (E).

Examples of suitable tris(alkoxycarbonylamino)triazines are given in U.S. Pat. No. 4,939,213, in U.S. Pat. No. 5,084,541, and in EP-A-0 624 577.

Examples of suitable amino resins (E) are all of the amino resins typically used in the coating industry sector, the properties of the resultant coating compositions being controllable via the reactivity of the amino resin. The resins are condensation products of aldehydes, more specifically formaldehyde, and, for example, urea, melamine, guanamine, and benzoguanamine. The amino resins comprise alcohol groups, specifically methylol groups, generally some of which, or specifically all of which, are etherified with alcohols. Use is made in particular of amino resins etherified with lower alcohols. In one or more embodiments, amino resins etherified with methanol and/or ethanol and/or butanol, examples being the products available commercially under the names Cymel®, Resimene®, Maprenal® and Luwipal® are used.

The amino resins (E) are long-established compounds and are described in detail in, for example, the United States patent application publication no. US 2005/0182189 A1, page 1, paragraph [0014], to page 4, paragraph [0028].

The binder mixture of the invention and/or the coating material of the invention may further comprise at least one customary and known coatings additive (F) in effective amounts, i.e., in amounts up to 30%, more specifically up to 25%, and more particularly up to 20%, by weight, based in each case on the binder content of the coating material.

Examples of suitable coatings additives (F) are as follows:
especially UV absorbers;
especially light stabilizers such as HALS compounds, benzotriazoles or oxalanilides;
free-radical scavengers;
slip additives;
polymerization inhibitors;
defoamers;
reactive diluents different from components (A) and (C), more particularly reactive diluents which become reactive only through reaction with further constituents and/or with water, such as Incozol or aspartic esters, for example;
wetting agents different from components (A) and (C), such as siloxanes, fluorine-containing compounds, carboxylic monoesters, phosphoric esters, polyacrylic acids and their copolymers, or polyurethanes;
adhesion promoters;
flow control agents;
film-forming assistants such as cellulose derivatives;
fillers such as, for example, nanoparticles based on silicon dioxide, aluminum oxide or zirconium oxide; for further details, refer to Römpp Lexikon "Lacke and Druckfarben", Georg Thieme Verlag, Stuttgart, 1998, pages 250 to 252;
rheology control additives different from components (A) and (C), such as the additives known from patents WO 94/22968, EP-A-0 276 501, EP-A-0 249 201 or WO 97/12945; crosslinked polymeric microparticles, of the kind disclosed in EP-A-0 008 127, for example; inorganic phyllosilicates such as aluminum magnesium silicates, sodium magnesium and sodium magnesium fluorine lithium phyllosilicates of the montmorillonite type; silicas such as Aerosils®; or synthetic polymers having ionic and/or associative groups, such as poly(meth)acylamide, poly(meth)acrylic acid, polyvinylpyrrolidone, styrene-maleic anhydride or ethylene maleic anhydride copolymers and their derivatives, or hydrophobically modified ethoxylated urethanes or polyacrylates;

flame retardants.

Particularly preferred are coating materials which comprise

50% to 70% by weight, based on the binder content of the coating material, of at least one polyhydroxyl group-containing polyacrylate (A) and/or at least one polyhydroxyl group-containing polymethacrylate (A), 25% to 40% by weight, based on the binder content of the coating material, of the polyisocyanate group-containing compound (B), 0% to 10% by weight, based on the binder content of the coating material, of the hydroxyl group-containing component (C), 0.5% to 5.0% by weight, based on the binder content of the coating material, of at least one monomeric aromatic carboxylic acid (S), 0% to 15% by weight, based on the binder content of the coating material, of one or more amino resins and/or one or more tris(alkoxycarbonylamino)triazines (E), and 0% to 20% by weight, based on the binder content of the coating material, of at least one customary and known coatings additive (F)

and comprise at least one zinc (1-methylimidazole)bis(2-ethylhexanoate) complex (D) in an amount such that the metal content of the zinc (1-methylimidazole)bis(2-ethylhexanoate) complex, based in each case on the binder content of the coating material, is between 100 and 1000 ppm.

In a further embodiment of the invention, the binder mixture or coating material of the invention may further comprise other pigments and/or fillers and may serve for producing pigmented topcoats and/or pigmented undercoats or primer-surfacers, more particularly pigmented topcoats. The pigments and/or fillers that are used for these purposes are known to the skilled person. The pigments are typically used in an amount such that the pigment-to-binder ratio is between 0.05:1 and 1.5:1, based in each case on the binder content of the coating material.

The invention further provides the inventive use of a catalyst system comprising at least one zinc (1-methylimidazole)bis(2-ethylhexanoate) complex (D) and at least one monomeric aromatic carboxylic acid (S) in which the carboxyl group is in conjugation to a pi electron system for the catalysis of the urethane reaction in coating material compositions which comprise at least one polyisocyanate group-containing component and at least one polyhydroxyl group-containing component. The catalyst system is notable for the combined use of the at least one zinc (1-methylimidazole)bis(2-ethylhexanoate) complex (D) and the at least one monomeric aromatic carboxylic acid (S) in which the carboxyl group is in conjugation to a pi electron system. In one or more embodiments, the catalysis reaction is carried out at 20 to 60° C. The coating material compositions comprise the above-described at least one polyhydroxyl group-containing component (A) and the at least one polyisocyanate group-containing component (B).

The coating materials of the invention may be applied by all of the customary application methods, such as spraying, knifecoating, spreading, pouring, dipping, impregnating, trickling or rolling, for example. In the course of such application, the substrate to be coated may itself be at rest, with the application equipment or system being moved. Alternatively, the substrate to be coated, more particularly a coil, may be moved, with the application system being at rest relative to the substrate or being moved appropriately.

Preference is given to employing spray application methods, such as, for example, compressed-air spraying, airless spraying, high-speed rotation, electrostatic spray application (ESTA), alone or in conjunction with hot spray application such as, for example, hot-air spraying.

Since the coatings of the invention produced from the coating materials of the invention also adhere outstandingly to already-cured electrocoat finishes, surfacer finishes, basecoat finishes or customary and known clearcoat finishes, they are outstanding suitable not only for use in automotive OEM (production-line) finishing but also for automotive refinish and/or for the coating of parts for installation in or on automobiles and/or for the coating of utility vehicles.

The applied coating materials of the invention can be cured after a certain rest time. The rest time serves, for example, for the flow and devolatization of the coating films or for the evaporation of volatile constituents such as solvents. The rest time may be assisted and/or shortened by use of elevated temperatures and/or by a reduced atmospheric humidity, provided that this does not entail any damage to or change in the coating films, such as premature complete crosslinking, for instance.

There are no peculiarities of method as far as the thermal curing of the coating materials is concerned; this curing instead takes place in accordance with the customary and known methods such as heating in a forced-air oven or irradiation with IR lamps. Thermal curing here may also take place in stages. Another preferred method of curing is that using near infrared (NIR) radiation.

Thermal curing takes place advantageously at a temperature of 20 to 200° C. for a time of 1 minute up to 10 hours, although longer cure times may also be employed at low temperatures. For automotive refinish and for the painting of plastics parts, and also for the finishing of utility vehicles, it is usual to employ relatively low temperatures, which are preferably between 20 and 80° C., more preferably between 20 and 60° C.

The coating materials of the invention are suitable for any kind of coatings, such as for electrocoats, coil coatings, wire enamels, and automobile finishes, as pulverant, solvent borne, solvent-free, and aqueous coating materials. The coating materials are used preferably as a high-grade coating on articles of any kind where, for reasons either of a technical nature or of economics, it is not possible to dry the coatings at high temperatures. These systems are employed in primer coats and also in topcoat systems. These topcoat systems may be pigmented or else may be employed as unpigmented systems (=clearcoats). With particular preference the coating material compositions of the invention are used in automotive refinish, preferably as automobile topcoat finishes (solid+CC).

The coating materials of the invention are outstandingly suitable for use as decorative, protective and/or effect coatings and finishes on bodywork of means of transport (more particularly motor vehicles, such as motorcycles, buses, trucks or automobiles) or of parts thereof; of the interior and exterior of edifices; of furniture, windows, and doors; of plastics moldings, more particularly compact discs and windows; of small industrial parts, of coils, containers, and packaging; of white goods; of films; of optical, electrical, and mechanical components; and also of hollow glassware and articles of everyday use.

Consequently, the coating materials of the invention can be applied, for example, to an uncoated or precoated substrate, the coating materials of the invention being either pigmented or unpigmented. The coating materials and finishes of the invention, more particularly the clearcoat finishes, are employed more particularly in the technologically and esthetically particularly demanding field of automotive OEM finishing and for the coating of plastics parts for installation in or on automobile bodies, more particularly for top-class automobile bodies, such as, for example, for producing roofs, tailgates, engine cowlings, fenders, bumpers, spoilers, sills, protective strips, side trim, and so on, and also for automotive refinish and for the finishing of utility vehicles, such as, for example, of trucks, chain-driven construction vehicles, such as crane vehicles, wheel loaders, and concrete mixers, buses, rail vehicles, watercraft, aircraft, and also agricultural equipment such as tractors and combines, and parts thereof.

The plastics parts are typically composed of ASA (acrylonitrile-styrene-acrylate), polycarbonates, blends of ASA and polycarbonates, polypropylene, polymethyl methacrylates or impact-modified polymethyl methacrylates, more particularly of blends of ASA and polycarbonates, preferably used with a polycarbonate fraction >40%, more particularly >50%.

ASA refers generally to impact-modified styrene-acrylonitrile polymers wherein graft copolymers of vinylaromatic compounds, more particularly styrene, and of vinyl cyanides, more particularly acrylonitrile, are present on polyalkyl acrylate rubbers in a copolymer matrix of, in particular, styrene and acrylonitrile.

In one or more embodiments, the coating materials of the invention are used in multistage coating methods, more particularly in methods which involve applying, to an uncoated or precoated substrate, first a pigmented basecoat film and thereafter a coat with the coating material of the invention. The invention accordingly also provides multicoat effect and/or color coating systems comprising at least one pigmented basecoat film and, disposed thereon, at least one clearcoat film, such systems preferably featuring a clearcoat film produced form the coating material of the invention.

Not only water-thinnable basecoats but also basecoats based on organic solvents may be used. Suitable basecoats are described in, for example, EP-A-0 692 007 and the documents cited therein at column 3, lines 50 et seq. Preferably, the applied basecoat is first dried, which means that, in an evaporation phase, at least some of the organic solvent and/or the water is removed from the basecoat film. Drying takes place preferably at temperatures from room temperature to 80° C. After drying has taken place, the coating material of the invention is applied. The two-coat finish is then preferably baked, under conditions employed in automotive OEM finishing, at temperatures from 20 to 200° C. for a time from 1 minute up to 10 hours, although longer cure times may be employed in the case of the temperatures employed for automotive refinish, which are generally between 20 and 80° C., more particularly between 20 and 60° C.

In specific embodiment of the invention, the coating material of the invention is used as a transparent clearcoat for the coating of plastics substrates, more particularly of plastics parts for installation in or on other articles. These plastics parts are likewise coated in a multistage coating method, which involves applying, to an uncoated or precoated substrate or to a substrate which has been pretreated for improved adhesion of the subsequent coatings (for example, by flaming, corona treatment or plasma treatment of the substrate), first a pigmented basecoat film and thereafter a coat with the coating material of the invention.

The invention further relates to coatings produced from the coating material compositions of the invention or produced using in combination a catalyst system comprising at least one zinc (1-methylimidazole)bis(2-ethylhexanoate) complex (D) and at least one aromatic carboxylic acid (S) in which the carboxyl group is in conjugation to a pi electron system. These coatings find application in the automobile sector. The coatings may also serve for producing multicoat paint systems. Consequently, the invention further describes multicoat systems which comprise at least one coating of the invention. In one or more embodiments, the multicoat systems are automobile finishes.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

Examples

Gel Permeation Chromatography (GPC)

The gel permeation chromatography was carried out at 40° C. using a high-pressure liquid chromatography pump and a refractive-index detector. The eluent used was tetrahydrofuran, with an elution rate of 1 ml/min. the calibration was carried out by means of polystyrene standards. The number-average molecular weight Mn, the weight-average molecular weight Mw, and Mp were ascertained, the polydispersity index Mp being calculated from Mp=Mw/Mn.

Hydroxyl Number/Acid Number:

The hydroxyl number is calculated via the fraction of OH-functional components used and expressed in mg of KOH per gram of resin solids. The hydroxyl number (OH number) indicates the number of mg of potassium hydroxide equivalent to the amount of acetic acid bound by 1 g of substance on acetylation.

The acid number here indicates the number of mg of potassium hydroxide consumed in neutralizing 1 g of the respective compound (DIN EN ISO 2114). This analysis is done with ethonolic potassium hydroxide solution. To detect the amount of unreacted anhydrides an additional comparative titration with aqueous potassium hydroxide solution is done. By this procedure a detection of unreacted anhydrides is possible as under aqueous conditions, both acid groups of the anhydride can be found.

Solids Determination

Approximately 1 g of sample are weighed out into a tin plate lid. Following addition of around 3 ml of butyl acetate, the sample is dried in a drying cabinet at 130° C. for 60 minutes, cooled in a desiccator, and then weighed again. The residue corresponds to the solids fraction.

Binder Content Determination

The binder fraction means in each case that fraction of the coating composition that is soluble in tetrahydrofuran (THF), prior to crosslinking. For its determination, a small sample (P) is weighed out, dissolved in 50 to 100 times the amount of THF, insoluble constituents are removed by filtration, the THF is evaporated off, and then the solids of the constituents previously dissolved in THF is ascertained by drying at 130° C. for 60 minutes, cooling in a desiccator, and then repeat weighing. The residue corresponds to the binder content of the sample (P).

Freedom from Tack by the Zapon Tack Test (ZTT):

An aluminum strip with a thickness of 0.5 mm, a width of 2.5 cm, and a length of 11 cm is bent at an angle of 110° to give a surface measuring 2.5×2.5 cm. The long side of the metal plate is bent, after a further 2.5 cm, by about 15°, so that the plate is just held in balance by a weight (5 g) placed in the center of the square area. For the measurement of the ZTT tack-free state, the bent plate is placed on the coating film and weighed down with a 100 g weight for 30 seconds. Following removal of the weight, the coating is considered tack-free if the metal angle falls over within 5 s. The test is repeated at intervals of 15 minutes. Before the test is deployed, the tackiness of the coating film is assessed qualitatively by touch. In the case of tests at elevated temperature, the test panels are stored at room temperature for 10 minutes for cooling before the test is commenced.

Print Test:

The coating film is drawn down using a 100 micrometer applicator onto a glass plate. After drying at 60° C. for 30 minutes, the glass plate, within a period of 10 minutes following removal from the oven, is placed on a commercial laboratory balance. Using thumb pressure, the film is then loaded with a weight of 2 kg for 20 seconds. This test is repeated every 10 minutes. In the case of a coating film which is obviously still soft or tacky, the coating film is first left until it has reached a sufficient freedom from tack, and a sufficient hardness. The tests are evaluated after a storage time of 24 hours. For the evaluation, the surface of the coating is washed off with aqueous surfactant solution (commercial washing-up detergent) and a soft cloth, in order to remove grease marks. The coating is considered satisfactory if there is no visible thumb imprint on the coating film. This test is a measure of the assembly strength of refinishes—the earlier that the coating film has attained its assembly strength after forced drying, the earlier that assembly operations (or disassembly operations to remove adhesive masking) may be commenced on the refinished bodywork.

Drying Recorder:

The coating is drawn down using a 100 micrometer applicator onto glass plates with dimensions of 280 mm×25 mm. With the aid of the Byk Dry-time Recorder, needles are drawn over the film at a defined speed. Assessments are made of three different phases and also of the total length (i.e., sum of phase 1+phase 2+phase 3) of the track.

Phase 1: the needle track closes up again

Phase 2: the needle track results in a deep furrow in the coating film

Phase 3: the needle causes only superficial damage to the film

The assessment is always undertaken against a standard.

Millbase:

86.4 g of a styrene-containing polyacrylate (62% in solvent naphtha/EEP/MIBK (20/46/34)) having a molecular weight of 1600-2200 (Mn) and 4000-5000 (Mw), an acid number of 12-16 mg KOH/g, an OH number (OHN) of about 130 mg KOH/g (resin solids), and a viscosity of the 60% strength solution in butyl acetate of 200-400 mPa·s, measured using a rotary viscometer (Brookfield CAP 2000, spindle 3, 1000 rpm) are stirred together with 6.4 g of methyl isobutyl ketone, 2.2 g of a commercial light stabilizer mixture composed of UV and HALS light stabilizers and also with 0.15 g of a commercial flow control agent based on a polyacrylate, to form a homogeneous mixture. Added to this mixture, where indicated, is the corresponding catalyst, which is mixed in with stirring. When benzoic acid is used, it is dissolved in the millbase mixture as a solid, with stirring. For adjustment of viscosity, a further 1.0 part of methyl isobutyl ketone and 2.80 parts of butyl acetate are added.

Curing Agent Solution:

In a mixture of 6.38 parts of xylene, 9.238 parts of butyl acetate, 1.86 parts of ethyl ethoxypropionate, 8.68 parts of methyl isobutyl ketone, and 0.310 part of a commercial flow control agent based on a polyacrylate (55% in solvent naphtha), 34.70 g of trimerized hexamethylene diisocyanate (HDI) containing isocyanurate groups and having an isocyanate content of 22.0%, based on the solvent-free trimerized hexamethylene diisocyanate, are dissolved.

Catalysts

Catalyst Solution K1:

16.22 g of zinc(II) bis(2-ethylhexanoate) are dissolved in 5 g of butyl acetate. 3.78 g of 1-methylimidazole are added slowly dropwise. After the exothermic reaction has subsided, stirring is continued at 60° C. for 30 minutes more. This gives a viscous yellowish solution having a zinc content of 11.7%.

Catalyst Solution K2:

13.64 g of zinc(II) bis(2-ethylhexanoate) are dissolved in 5 g of butyl acetate. 6.36 g of 1-methylimidazole are added slowly dropwise. After the exothermic reaction has subsided, stirring is continued at 60° C. for 30 minutes more. This gives a viscous yellowish solution having a zinc content of 9.6%.

Synthesis of Phthalic Acid Halfester (P):

163 g Phthalic anhydride and 86.12 g butanol are heated to 80° C. under nitrogen gas atmosphere in a three-necked glass flask equipped with a stirrer and reflux column. After reaction time of 8 h a white precipitate is filtered off. The resulting clear solution contains according to IR analysis phthalic acid, phthalic acid halfester and di-ester. The acid-number of the mixture is detected to be 510 mg KOH/g.

Experimental Procedure:

Additional components such as benzoic acid and catalyst solutions are dissolved in the millbase. Following gentle stirring, clear solutions are obtained. For the implementation of the experiments, the millbase is introduced and the curing agent is added. The solution is homogenized by stirring. For the viscosity measurements, adjustment to the specified viscosity is made by addition of solvent. For the glass drawdowns, the viscosity adjustment is not made. For the drying test, the coating film is drawn down using a 100 micrometer four-way bar applicator onto glass plates to produce a film thickness of 30-35 micrometers. For the testing of the pendulum hardness, the film is poured onto glass plates, and before the Koenig film hardness is ascertained, the thickness of the applied film at the score mark (DIN 50933) is measured. For the tests using a drying recorder, the samples are likewise drawn down using a 100 micrometer four-way bar applicator onto suitable glass strips with length of approximately 280 mm and a width of approximately 25 mm; the film thicknesses achieved thereby are 30-35 micrometers.

Results of Experimentation:
Catalyst K1

| Designation | C1 | C2 | I1 | I2 | I3 | I4 | I5 |
|---|---|---|---|---|---|---|---|
| Millbase | 98.97 | 98.97 | 98.97 | 98.97 | 98.97 | 98.97 | 98.97 |
| DIBUTYLTIN DILAURATE | 0.067 | | | | | | |
| Benzoic acid | 1.610 | | 0.805 | 1.610 | 1.610 | 1.610 | |
| Phthalic halfester mixture P | | | | | | | 1.788 |
| K1 | | 0.110 | 0.110 | 0.110 | 0.055 | 0.028 | 0.028 |
| Curing agent solution | 61.17 | 61.17 | 61.17 | 61.17 | 61.17 | 61.17 | 61.17 |
| Metal content [ppm] | 135 | 145 | 145 | 145 | 75 | 35 | 35 |

Results

| Pot life DIN 4 [s] | | | | | | | |
|---|---|---|---|---|---|---|---|
| directly | 19 | 18 | 18 | 20 | 19 | 19 | 21 |
| after 1 h | 23 | 20 | 20 | 23 | 21 | 20 | 24 |
| after 2 h | 36 | 21 | 23 | 28 | 25 | 23 | 31 |
| after 3 h | 78 | 24 | 28 | 38 | 33 | 26 | 45 |
| after 4 h | | 29 | 39 | 64 | 56 | 34 | |
| ZAPON tack | | | | | | | |
| 30 min 60° C./10 min RT [min] | 10 | 120 | 10 | 10 | 10 | 10 | 10 |
| Koenig pendulum damping in swings | | | | | | | |
| 23° C. RT after 1 d | 100 | 100 | 58 | 111 | 107 | 109 | 70 |
| 23° C. RT after 2 d | 133 | 140 | 80 | 141 | 143 | 143 | 83 |
| 23° C. RT after 7 d | 126 | 151 | 87 | 143 | 146 | 148 | 95 |
| 30 min 60° C. after 1 d | 121 | 90 | 124 | 135 | 135 | 129 | 78 |
| 30 min 60° C. after 2 d | 138 | 140 | 147 | 147 | 143 | 135 | 84 |
| 30 min 60° C. after 7 d | 145 | 149 | 151 | 151 | 149 | 147 | 87 |
| Drying Recorder | | | | | | | |
| Total length of scratch track [cm] | 21.2 | 29.7 | 20.4 | 20.1 | 22.7 | 29.5 | 21 |
| Phase 1 [cm] | 3.8 | 7.2 | 4.9 | 8.1 | 7.1 | 7.6 | 8 |
| Phase 2 [cm] | 3.3 | 14.6 | 11.2 | 6 | 9.3 | 14.7 | 3.5 |
| Phase 3 [cm] | 13.1 | 7.9 | 4.3 | 6 | 6.3 | 7.2 | 9.5 |
| Print test - 30 min 60° C. (imprint no longer visible after [h]) | 0 | >6 | 1 | 1 | 1 | 1 | 1.5 |

Catalyst K2

| Designation | C3 | I5 | I6 | I7 | I8 | I9 |
|---|---|---|---|---|---|---|
| Millbase | 98.97 | 98.97 | 98.97 | 98.97 | 98.97 | 98.97 |
| DIBUTYLTIN DILAURATE | | | | | | |
| Benzoic acid | | 0.805 | 1.610 | 1.610 | 1.610 | 1.610 |
| Phthalic halfester mixture P | | | | | | 1.788 |
| K2 | 0.130 | 0.130 | 0.130 | 0.070 | 0.035 | 0.035 |
| Curing agent solution | 61.17 | 61.17 | 61.17 | 61.17 | 61.17 | 61.17 |
| Metal content [ppm] | 145 | 145 | 145 | 75 | 35 | 35 |

Results

| Pot life DIN 4 [s] | | | | | | |
|---|---|---|---|---|---|---|
| directly | 18 | 18 | 18 | 18 | 18 | 20 |
| after 1 h | 18 | 19 | 20 | 20 | 20 | 22 |
| after 2 h | 20 | 21 | 23 | 22 | 22 | 25 |
| after 3 h | 21 | 24 | 28 | 26 | 25 | 28 |
| after 4 h | 23 | 27 | 35 | 30 | 28 | 33.5 |
| ZAPON tack | | | | | | |
| 30 min 60° C./10 min RT [min] | 200 | 10 | 10 | 10 | 10 | 10 |
| Koenig pendulum damping in swings | | | | | | |
| 23° C. RT after 1 d | 56 | 77 | 89 | 91 | 55 | 77 |
| 23° C. RT after 2 d | 139 | 141 | 134 | 139 | 79 | 87 |
| 23° C. RT after 7 d | 150 | 148 | 142 | 144 | 82 | 92 |
| 30 min 60° C. after 1 d | 79 | 113 | 126 | 123 | 117 | 81 |
| 30 min 60° C. after 2 d | 140 | 145 | 148 | 145 | 154 | 86 |
| 30 min 60° C. after 7 d | 151 | 151 | 151 | 151 | 151 | 91 |
| Drying Recorder | | | | | | |
| Total length of scratch track [cm] | 29.8 | 29.8 | 24.8 | 29.6 | 29.6 | 28.7 |
| Phase 1 [cm] | 5.7 | 8.2 | 7.1 | 7.6 | 6.5 | 11 |
| Phase 2 [cm] | 17 | 9.4 | 7.6 | 9.4 | 7.5 | 5.6 |
| Phase 3 [cm] | 7.1 | 12.2 | 10.1 | 12.6 | 15.6 | 12.1 |
| Print test - 30 min 60° C. (imprint no longer visible after [h]) | >6 | 0 | 0 | 0 | 0 | 1.5 |

In the experiments, it is apparent that, through combination of the above-discussed zinc (1-methylimidazole)bis(2-ethylhexanoate) complexes with the benzoic acid, assembly strength can be achieved significantly earlier than without benzoic acid. It is also evident, moreover, that by varying the amounts of benzoic acid and zinc catalyst it is possible to optimize hardness and to achieve very good assembly strength and an optimum pot life. It is furthermore shown that the phthalic halfester mixture influences the hardness. The low pendulum hardness values are caused by a low content of butanol and on the other hand the butylester of phthalic acid may act as plasticizer in the coating system.

What is claimed is:
1. A coating material composition consisting essentially of:
   at least one polyhydroxyl group-containing component (A) and optionally at least one low molecular mass polyol compound (C);
   at least one polyisocyanate group-containing component (B);

a catalyst system consisting of:
a) at least one zinc (1-methylimidazole)bis(2-ethylhexanoate) complex (D) having the general formula [Zn(1-methylimidazole)$_n$(2-ethylhexanoate)$_2$], wherein n≥1 to ≤2; and
b) at least one monomeric aromatic carboxylic acid (S), wherein the carboxyl group is in conjugation to a pi electron system;
optionally, one or more amino resins and/or one or more tris(alkoxycarbonylamino)triazines (E);
optionally, pigments and/or fillers; and
optionally, organic solvents and/or water.

2. A coating material composition comprising:
at least one polyhydroxyl group-containing component (A);
at least one polyisocyanate group-containing component (B);
at least one low molecular mass polyol compound (C); and
a catalyst system consisting of
a) at least one zinc (1-methylimidazole)bis(2-ethylhexanoate) complex (D) having the general formula [Zn(1-methylimidazole)$_n$(2-ethylhexanoate)$_2$], wherein n≥1 to ≤2; and b) at least one monomeric aromatic carboxylic acid (S), wherein the carboxyl group is in conjugation to a pi electron system;
wherein the coating composition exhibits improved processing life as compared to a coating material composition containing a dibutyl tin laurate catalyst and the at least one monomeric aromatic carboxylic acid (S), and;
wherein the coating material composition exhibits a shorter drying time and earlier achievement of assembly strength as compared to a coating material composition containing the zinc (1-methylimidazole)bis(2-ethylhexanoate) complex (D) without benzoic acid.

3. The coating material composition of claim 2, wherein the at least one polyhydroxyl group-containing component (A) comprises a poly(meth)acrylate polyol and/or a polyester resin.

4. The coating material composition of claim 2, wherein the polyisocyanate group-containing component (B) comprises 1,6-hexamethylene diisocyanate, isophorone diisocyanate, or 4,4'-methylenedicyclohexyl diisocyanate, their biuret dimers and/or their isocyanurate trimers and/or their asymmetric trimers.

5. The coating material composition of claim 2, wherein the at least one monomeric aromatic carboxylic acid (S) comprises benzoic acid, tert-butylbenzoic acid, 3,4-dihydroxybenzoic acid, salicylic acid and/or acetylsalicylic acid.

6. The coating material composition of claim 2, wherein the at least one zinc (1-methylimidazole)bis(2-ethylhexanoate) complex (D) is present in an amount such that the metal content of the zinc (1-methylimidazole)bis(2-ethylhexanoate) complex, based in each case on the binder fraction of the coating material, is between 35 and 2000 ppm, and/or the coating material comprises 0.2% to 15.0%, by weight, of at least one monomeric carboxylic acid (S), the percentages by weight again each being based on the binder fraction of the coating material.

7. The coating material composition of claim 2, wherein the at least one low molecular mass polyol compound (C) is different from component (A), and/or wherein the molar equivalent ratio of the hydroxyl groups of the hydroxyl-containing compound (A) plus (C) to the isocyanate groups of component (B) is between 1:0.9 and 1:1.5.

8. The coating material composition of claim 2, wherein the coating material composition is a nonaqueous coating material and/or comprises pigments.

9. A catalyst system consisting of at least one zinc (1-methylimidazole)bis(2-ethylhexanoate) complex (D) and at least one monomeric aromatic carboxylic acid (S) in which the carboxyl group is in conjugation to a pi electron system, wherein the catalyst system catalyzes a urethane reaction in a coating material composition comprising at least one polyisocyanate group-containing component and at least one polyhydroxyl group-containing component.

10. A coating material composition consisting essentially of the catalyst system of claim 9, the at least one polyhydroxyl group-containing component (A) and the at least one polyisocyanate group-containing component (B).

11. A method of coating, the method comprising producing a coat of the coating material composition of claim 2 on an automobile.

12. A multistage coating method, comprising applying, to an uncoated or precoated substrate, a pigmented basecoat film and thereafter a coat of the coating material composition of claim 2.

13. The multistage coating method of claim 12, wherein, following application of the pigmented basecoat film, the applied basecoat is first dried at temperatures from 23° C. room temperature to 80° C. and, following the application of the coating material, is cured at temperatures between 20 and 80° C.

14. A method of coating, the method comprising coating a substrate with a clearcoat or pigmented paint comprising the coating composition of claim 2, wherein the substrate comprises one or more of an automotive surface, a parts surface, a plastics substrate, or a utility vehicle surface.

15. The method of claim 12, wherein the substrate comprises one or more of an automotive surface, a plastic substrate, or an utility vehicle surface.

16. An automobile coating comprising at least one coat of the coating material composition of claim 2.

17. A multistage coating method, comprising applying, to an uncoated or precoated substrate, a pigmented basecoat film and thereafter applying a coating material composition produced through use of the catalyst system of claim 9.

18. The multistage coating method of claim 17, wherein, following application of the pigmented basecoat film, the applied basecoat is first dried at temperatures from 23° C. room temperature to 80° C. and, following the application of the coating material composition, is cured at temperatures between 20 and 80° C.

19. The coating material composition of claim 3, wherein the polyhydroxyl group-containing component (A) comprises a poly(meth)acrylate polyol.

20. The coating material composition of claim 5, wherein at least one monomeric aromatic carboxylic acid (S) component of the catalyst system is benzoic acid.

21. The coating material composition of claim 7, wherein the molar equivalent ratio of the hydroxyl groups of the hydroxyl-containing compound (A) plus, where appropriate, (C) to the isocyanate groups of component (B) is between 1:0.95 and 1:1.05.

22. The multistage coating method of claim 17, wherein catalysis is carried out at a temperature in the range of from 20 to 60° C.

23. A method for extending processing life of a coating material composition which comprises at least one polyisocyanate group-containing component and at least one polyhydroxyl group-containing component, the method comprising the step of adding to the coating material composition a catalyst system consisting of at least one zinc (1-methylimidazole)bis(2-ethylhexanoate) complex (D) and at least one monomeric aromatic carboxylic acid (S) in which the carboxyl group is in conjugation to a pi electron system.

24. The method according to claim 23 wherein at least one monomeric aromatic carboxylic acid (S) component of the catalyst system is benzoic acid.

25. The coating material composition according to claim 1, wherein the at least one low molecular mass polyol compound (C) is selected from the group consisting of: ethylene glycol; neopentyl glycol; 1,2-propanediol; 2,2-dimethyl-1,3-propanediol; 1,4-butanediol; 1,3-butanediol; 1,5-pentanediol; 2,2,4-trimethyl-1,3-pentanediol; 1,6-hexanediol; 1,4-cyclohexanedimethanol; 1,2-cyclohexanedimethanol; trimethylolethane; trimethylolpropane; trimethylolhexane; 1,2,4-butanetriol, pentaerythritol; and dipentaerythritol.

26. The coating material composition according to claim 2, wherein the at least one low molecular mass polyol compound (C) is selected from the group consisting of: ethylene glycol; neopentyl glycol; 1,2-propanediol; 2,2-dimethyl-1,3-propanediol; 1,4-butanediol; 1,3-butanediol; 1,5-pentanediol; 2,2,4-trimethyl-1,3-pentanediol; 1,6-hexanediol; 1,4-cyclohexanedimethanol; 1,2-cyclohexanedimethanol; trimethylolethane; trimethylolpropane; trimethylolhexane; 1,2,4-butanetriol, pentaerythritol; and dipentaerythritol.

* * * * *